(12) United States Patent
Podoloff et al.

(10) Patent No.: US 8,050,891 B2
(45) Date of Patent: Nov. 1, 2011

(54) SENSOR MAPPING

(75) Inventors: Rob Podoloff, Framingham, MA (US);
Paul William Calnan, Somerville, MA (US); Elaine Chen, Arlington, MA (US);
Beth Marcus, Bedford, MA (US)

(73) Assignee: Zeemote Technology Inc., Taipei (TW)

( * ) Notice: Subject to any disclaimer, the term of this patent is extended or adjusted under 35 U.S.C. 154(b) by 470 days.

(21) Appl. No.: 12/253,808

(22) Filed: Oct. 17, 2008

(65) Prior Publication Data
US 2010/0100359 A1   Apr. 22, 2010

(51) Int. Cl.
*H03F 1/26* (2006.01)
(52) U.S. Cl. ...................................................... 702/191
(58) Field of Classification Search .................. 702/191, 702/182–185, 188
See application file for complete search history.

(56) References Cited

U.S. PATENT DOCUMENTS
7,689,321 B2 *   3/2010   Karlsson ....................... 700/253
* cited by examiner

*Primary Examiner* — Edward Raymond
(74) *Attorney, Agent, or Firm* — Mauriel Kapouytian & Treffert LLP; Michael Mauriel (57) ABSTRACT

Techniques, systems and computer program products are disclosed for providing sensor mapping. In one aspect, a method includes receiving input from a user. The received input includes at least one of motion, force and contact. In addition, a sensor signal is generated based on the received input. From a choice of data structures a data structure associated with a selected application having one or more functions is identified. The data structure indicates a relationship between the generated sensor signal and the one or more functions of the selected application. The generated sensor signal is selectively mapped into a control signal for controlling the one or more functions of the selected application by using the identified data structure.

29 Claims, 9 Drawing Sheets

SENSOR MAPPING

TECHNICAL FIELD

This disclosure is directed to translating user input.

BACKGROUND

For different software/firmware applications, the intended purpose and the degree of user input needed may vary across a wide spectrum. These applications can use at least one of two types of input by a human operator: (1) text input, and (2) spatial input. Spatial input translates to control signals that can include defining the x-y coordinates of a mouse cursor, the direction in which a character should move in a game, the orientation and zoom level of a 3D object in a computer aided design (CAD) package or the like.

SUMMARY

Techniques and systems are described to represent a relationship between human movement or applied force and the control signal to an application using a variety of models, which can be linear or non-linear, to optimize performance for a particular application. Because this relationship may change depending on the application, variable sensor mapping is provided to adapt a control signal to the particular application. Systems and techniques are described to assign different sensor mapping curves to the output from a particular input device or output channel from a device, in order to adapt its output to the specific control signal needs of different applications. The variable mapping curve can be flexible and adjustable to accommodate a new mapping scheme for new control signal needs. Further, for different classes of spatial control signal needs, an optimal sensor mapping curve or output channel mapping can be generated.

In one aspect, a method includes receiving input from a user. The received input includes at least one of motion, force and contact. In addition, a sensor signal is generated based on the received input. From a choice of data structures a data structure associated with a selected application having one or more functions is identified. The data structure indicates a relationship between the generated sensor signal and the one or more functions of the selected application. The generated sensor signal is selectively mapped into a control signal for controlling the one or more functions of the selected application by using the identified data structure.

Implementations can optionally include one or more of the following features. The identified data structure can be selected from the choice of data structures based on a type of the selected application. Also, the identified mapping curve can be selected from the choice of data structures based on the one or more functions of the selected application. The generated sensor signal can be conditioned to include at least one of smoothing, noise reduction and non-linear conformal mapping. Identifying a data structure can include identifying a data structure that includes a mapping curve from a choice of mapping curves. Identifying the mapping curve can include identifying a nonlinear mapping curve that includes a slope near a center of the curve and another slope near extrema of the curve. The other slope is less steep than the slope near the center. Identifying a data structure can include identifying a data structure that includes a lookup table. The identified lookup table can be streamed from a host device to an input device. The generated sensor signal can be selectively mapped into the control signal using the streamed lookup table.

In another aspect, a system includes a sensor component designed to receive input from a user. The received input includes at least one of motion, force and contact. The sensor component also generates a sensor signal based on the received input. The system includes a sensor mapping component to communicate with the sensor component. The sensor mapping component is designed to receive a data structure selected from a choice of data structures that indicates a relationship between the generated sensor signal and one or more functions of a selected application. Also, the sensor mapping component is designed to selectively convert the generated sensor signal into a control signal to control the one or more functions of the selected application using the received data structure.

Implementations can optionally include one or more of the following features. The system can include a data storage component to communicate with the sensor mapping component. The data storage component can store the choice of data structures to be forwarded to the sensor mapping component. The system can include a selector component to communicate with the selected application and the data storage component. The mapping curve selector component is designed to select a data structure from the choice of data structures stored in the data storage component based on the selected application. Also, the mapping curve selector component is also designed to forward the selected data structure to the sensor mapping component to use in converting the sensor signal. Also, a device driver can be connected to the mapping curve selector component. The system can include an input device and a host device to communicate with the input device. The sensor mapping component and the data storage component can be disposed within the input device. The selector component can be disposed within the host device separate from the input device. The selector component is designed to communicate with the storage device over a wired or wireless communication medium to select the data structure from the choice of data structures. Alternatively, the sensor mapping component can be disposed within the input device, and the data storage component and the selector component can be disposed within the host device separate from the input device. The sensor mapping component can communicate with the storage device over a wired or wireless communication medium to receive the identified data structure. Alternatively, the sensor component can be disposed within the input device, and the sensor mapping component, the data storage component and the selector component can be disposed within the host device. The sensor mapping component can communicate with the sensor component over a wired or wireless communication medium to receive the sensor signal. The selector component can be designed to identify the data structure from the choice of data structures based on the selected application that includes a game application. The selector component can be designed to identify the data structure from the choice of data structures based on a type of application. The selector component can be designed to identify the data structure from the choice of data structures that includes at least one nonlinear mapping curve. The selector component can be designed to select the identified mapping curve based on the one or more functions of the selected application. The data storage component can be designed to store the choice of data structures comprising lookup tables; and stream one of the lookup tables to the sensor mapping component. The data storage component can be designed to store the choice of data structures comprising mapping curves; and stream one of the mapping curves to the sensor mapping component.

Yet in another aspect, a computer program product, embodied on a computer readable medium, is operable to cause a data processing apparatus to perform various operations. For example, the computer program product can be operable to cause the data processing apparatus to receive input from a user. The received input includes at least one of motion, force and contact. The computer program product can be operable to generate a sensor signal based on the received input. The computer program product can be operable to identify a data structure associated with a selected application having one or more functions. The identified data structure indicates a relationship between the generated sensor signal and the one or more functions of the selected application. The computer program product can be operable to selectively convert the sensor signal into a control signal for controlling the one or more functions of the selected application based on the identified data structure.

Implementations can optionally include one or more of the following features. The computer program product can be operable to cause a data processing apparatus to select the identified data structure based on a type of the selected application. The computer program product can be operable to cause a data processing apparatus to adjust the identified mapping curve based on the one or more functions of the selected application. The computer program product can be operable to cause a data processing apparatus to select a data structure from a choice of data structures associated with the selected application. The computer program can be operable to cause a data processing apparatus to select a lookup table from the choice of data structures comprising lookup tables. The computer program product can be operable to cause a data processing apparatus to stream the selected lookup table from a host device to an input device. The streamed lookup table is used to convert the generated sensor signal into the control signal at the input device. The computer program product can be operable to cause a data processing apparatus to condition the raw signal that includes at least one of smoothing, noise reduction and non-linear conformal mapping.

The techniques and systems as described in this specification can optionally provide one or more of the following advantages. A customized mapping mechanism as described in this specification can be used to capture and translate the intended user input into control signals that affect the behavior of a particular software or firmware application running on various computing platforms. Also, sensor mapping curves that relate human user movement and game action or even mouse cursor movement may yield a better user experience. Moreover, a specific sensor mapping curve can be used for each application to provide a solution best suited for that application. By identifying classes of spatial control signal needs for different applications, an optimal sensor mapping curve can be generated for each class of spatial input needs.

Further, a sensor mapping curve can be adjustable or customizable to enable a system that allows different applications to refresh the sensor mapping curve to a more optimal form that best matches a particular human interface needs. Because the techniques and systems described in this specification enable customized scales and thresholds for controls, the sensor mapping curve is not limited to true curves. Such an adjustable or customizable sensor mapping curve may allow the input device to provide the same user experience for different types of applications without the applications having to implement their own sensor mapping curves.

Sensor mapping curves can be used to fulfill the spatial control needs of an application that does not accept analog control signals. This is possible by translating the analog signal output from the sensor mapping curve to the rate of change of a digital signal that can be accepted by the application. For example, consider an application that uses a D-Pad (four directional buttons: up, down, left, right) to control a cursor. A sensor mapping curve can be used to translate joystick motion into a directional control signal like that provided by the D-Pad. Furthermore, the sensor mapping curve could specify a repeat rate (the frequency at which signals are repeated, similar to holding down a key on a computer keyboard) that is proportional to the angle of deflection of the joystick. Conversely, a digital signal or a set of digital signals can be processed using pulse-width-modulation (PWM) to obtain a rough approximation of a mapping curve.

The sensor mapping curves may be used by applications that include software or firmware applications running on a variety of computing platforms, such as desktop and notebook computers, mobile phones, smart phones and personal data assistant (PDA) devices, personal navigation systems, gaming consoles, hand held gaming devices, etc.

Other potential advantages include the following:

(1) Simplicity—A module can be provided to map human movement in some dimension or applied force with some body part to a control signal for an application. At the bottom is a mathematical equation, a function, or a look up table that maps the one to the other. The module can be changed to obtain the best performance out of the next input device and/or next application.

(2) Flexibility—Avoids "one-size-fits-all" mapping curve that may not work so well for some applications.

(3) Optimizes human performance for each class of spatial and contextual input for a particular type of application.

(4) Emulate analog behavior on applications that accept only digital signals or conversely, a digital signal or a set of digital signals can be processed using pulse-width-modulation (PWM) to obtain a rough approximation of a mapping curve.

In addition, the subject matter described in this specification can be implemented as a system including a processor and a memory coupled to the processor. The memory may encode one or more programs that cause the processor to perform one or more of the method acts described in this specification. Further, the subject matter described in this specification can be implemented using various data processing machines.

Details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Text input capture has been standardized with the ubiquitous QWERTY keyboard, such as chording keyboards. Spatial input, however, can be captured by a large variety of input devices designed to sense different types of motion and/or force applied.

Spatial input capture devices may include the following:

(1) various types of mice (optical, ball based, etc), where movement of the mouse is translated to the speed of movement of the mouse cursor;

(2) a touchpad on a notebook computer, where the movement of a finger or thumb is translated to the speed of movement of the mouse cursor;

(3) the touch stick on a notebook computer, where the amount of force applied by a finger is translated to the speed of movement of the mouse cursor;

(4) a trackball, where the rotation of the trackball is translated to the speed of movement of the mouse cursor;

(5) a gyroscope or accelerometer based mouse, where rotation in free space is mapped to the speed of movement of the mouse cursor;

(6) a 6 degrees-of-freedom (6DOF) input device, which senses forces applied in translational and rotational degrees of freedom, and converts those forces into speed of movement in translational and rotational freedoms in applications such as 3D Computer Aided Design (CAD) packages;

(7) desktop joystick, where deflection of the handle is translated to an action in a PC game, for example, in a first-person shooter, deflecting the handle to the left might aim the virtual weapon to the left, and vise versa;

(8) gaming controller with one or more thumb joysticks, or thumbsticks, where once again joystick angular deflection is mapped to an action in a game;

(9) a gaming controller with a motion sensor, such as the Nintendo® Wii® remote, that maps movement in free space to actions in a game;

(10) a hand held thumbstick, which can be used as a gaming controller on any computing platform, as a mouse replacement on a computer, and many other applications.

In these examples, a user input, typically a movement or an applied force can be mapped to a control signal for an application that drives a position, a direction, a speed of movement or some similar function. Many of the above described devices implement such mapping simply by linearizing the user input to the corresponding control signal. For example, a joystick or thumbstick may provide a proportionately linear signal that depends on how much angular deflection is effected by the user on the joystick or thumbstick. This linear signal can then be directly converted to the speed of movement of a game character in a given direction in a gaming application, for example.

While linear mapping may be straightforward to implement, linear mapping by itself may not provide optimal application-specific solutions with any given input device. For example, if a thumbstick is used as a universal controller for multiple applications on a computer, moving the mouse cursor on a 2D screen may be best achieved by different types of hand and wrist motions than controlling game play in a gaming application. Even among different gaming applications, the desired human input can be different. For example, the best way to control a racing game with a thumbstick may involve fast, large magnitude deflections to the physical limits of the device, while the best way to play a 2D board or puzzle game may involve momentary deflections in set directions to move a tile by one or more spaces on a grid.

Techniques, systems and computer program products are described in this specification for providing variable sensor mapping. For example a choice of data structure can be provided from which to select an appropriate data structure, such as a mapping curve.

Figure 1:
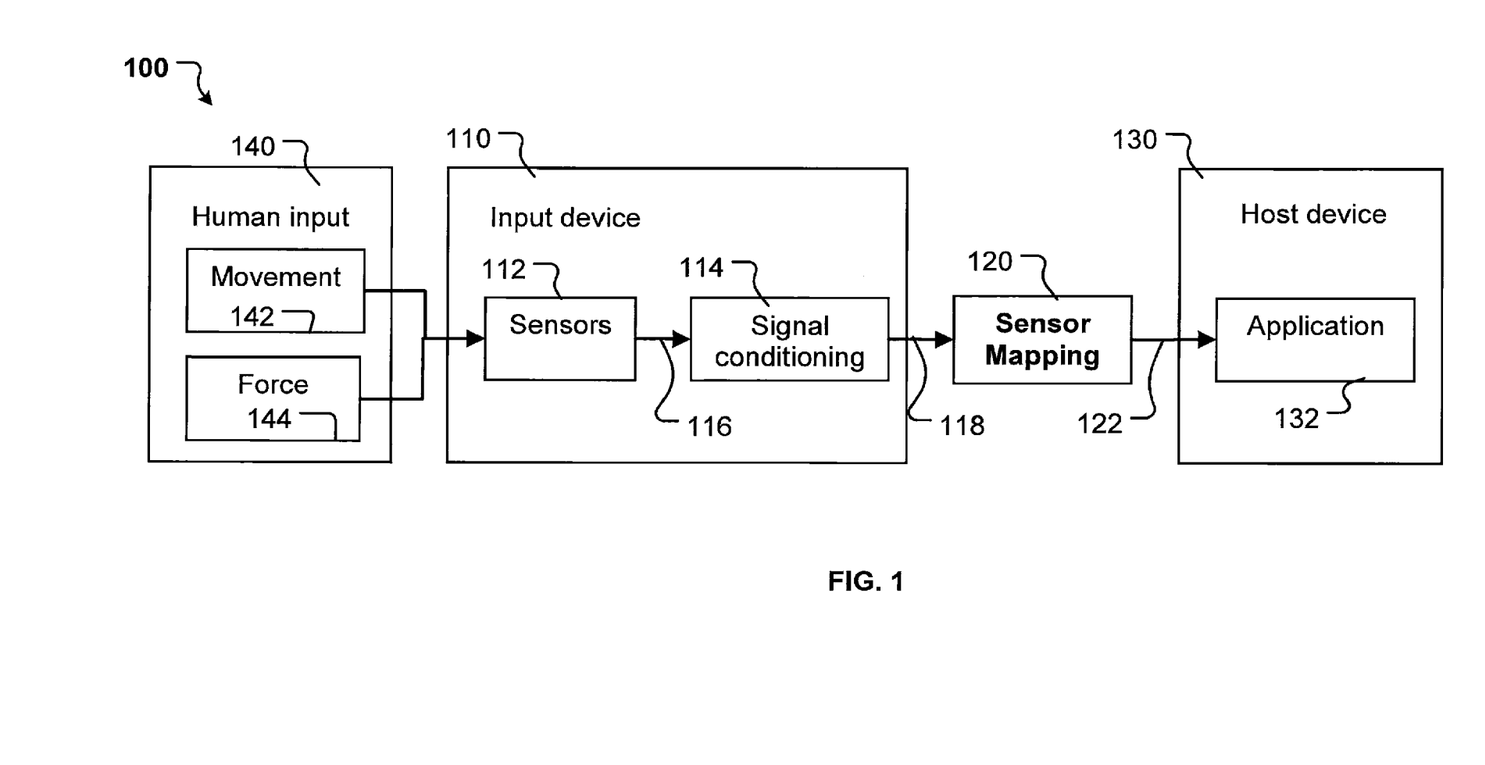
FIG. 1 is a block diagram illustrating an example system for mapping human user input to control signals that affect a behavior of a particular software or firmware application on a host device.

FIG. 1 is a block diagram illustrating an example system 100 for mapping human user input to control signals that affect a behavior of a particular software or firmware application on a host device. The system 100 includes an input device 110, a sensor mapping module 120 and a host device 130.

The input device 110 includes one or more sensors 112 and a signal conditioning module 114. A human user provides input 140 through the input device 110. The user input can include movement 142 and/or force 144, which is captured by a sensor 112 such as a two-degree-of-freedom (2DOF) joystick or thumbstick, a force sensor, a motion detector, a force sensitive resistor, etc. The movement 142 can include hand or thumb rotation movements that can be measured with a joystick or thumbstick, fingertip translational movements that can be measured with a touchpad, and so forth. The force 144 can include the amount of pressure applied to one or more locations on an instrumented surface, which can be measured by one or more force sensitive resistors, or it can include the amount of pressure applied against a touchstick in a given direction, which can be measured with strain gauges, optical sensors or other technologies.

The resulting sensor signal 116 is processed by the signal conditioning module 114 for on board signal processing. The signal conditioning module can include one or more of the following: a processor, a filter component, a digital signal processor, etc. For example, a first level of smoothing, noise reduction, and/or non-linear conformal mapping can be performed at this stage. However, in cases where the sensor 112 provides a clean, linear output based on the human input, the signal conditioning can be omitted. Alternatively, the signal conditioning unit may also involve simple electronics such as a low pass analog filter or the like. In this scenario, there is no need for a processor.

The output signal 118 from the signal conditioning module 114 is then fed to the sensor mapping module 120. The sensor mapping module 120 converts the conditioned sensor signal 118 into a control signal 122 for the application(s) 132 running on a host device 130, such as a mobile phone, a PC, a personal navigation system, or other such computing platforms.

Figure 2A:
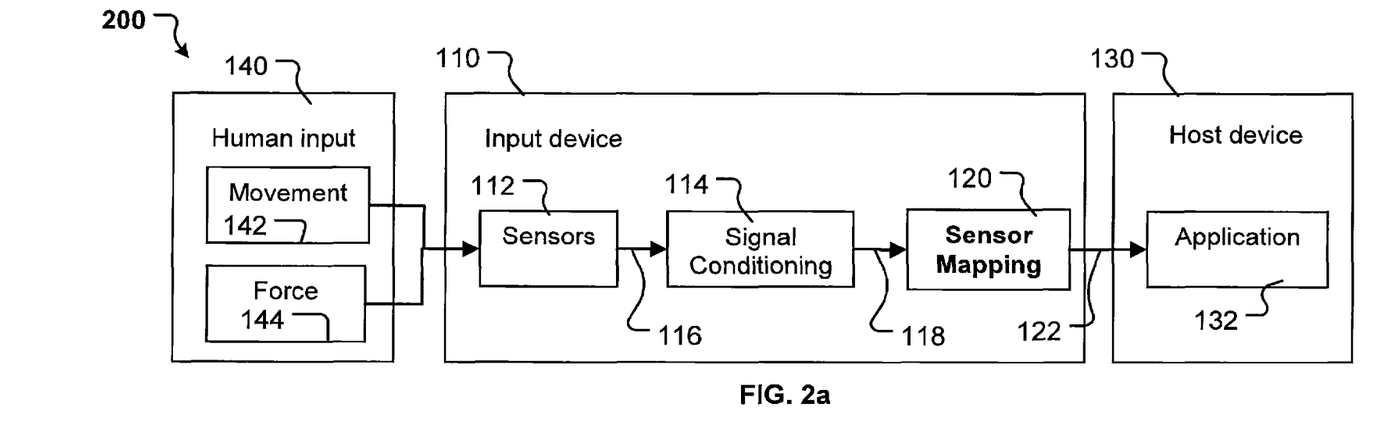
FIGS. 2a and 2b are block diagrams showing different example systems with different locations for a sensor mapping component or module.
Figure 2B:
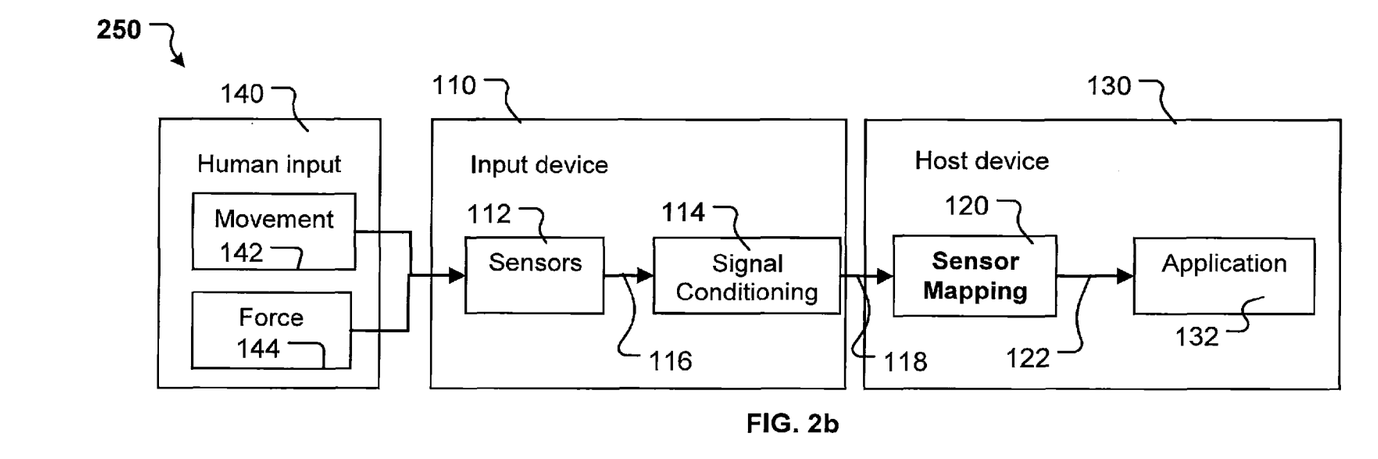

FIGS. 2*a* and 2*b* are block diagrams showing different example systems 200 and 250 with different locations for a sensor mapping component or module. The sensor mapping module 120 may be implemented in firmware running on an embedded microcontroller or microprocessor on the input device as shown in FIG. 2*a*. Alternatively, the sensor mapping module 120 may be implemented in software that either interfaces with or is integrated with the application(s) running on the host device as shown in FIG. 2*b*.

Figure 3:
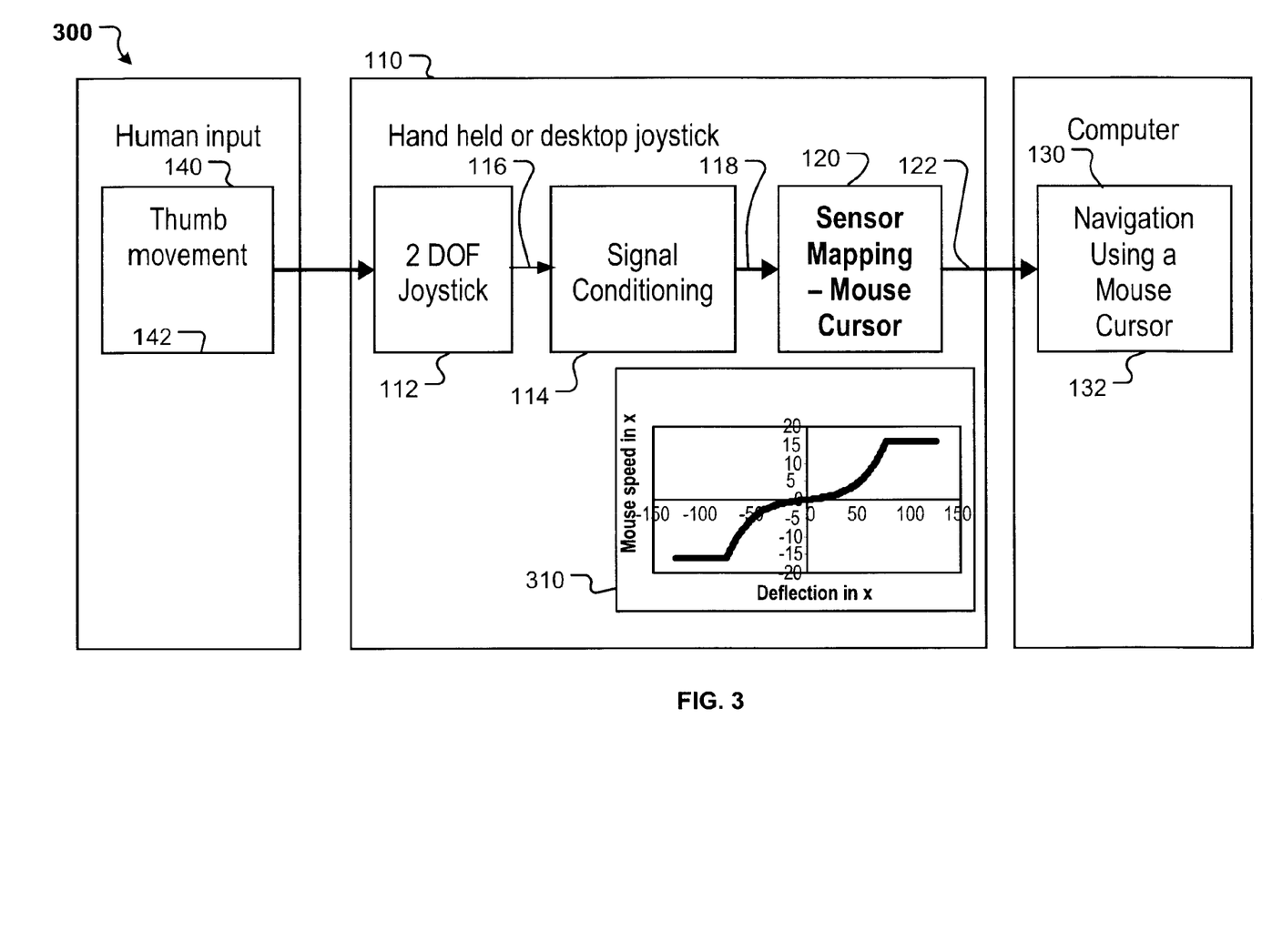
FIG. 3 is a block diagram showing an example system for using a 2 degrees of freedom thumbstick to capture thumb movements of a user.
Figures 4A, 4C:
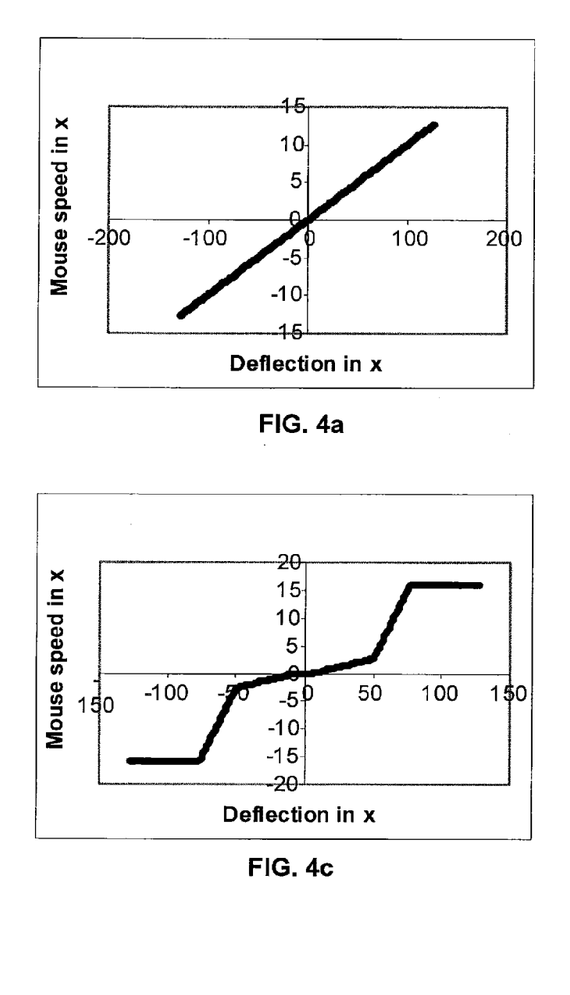
FIGS. 4a, 4b, 4c and 4d illustrate example sensor mapping curves.
Figures 4B, 4D:
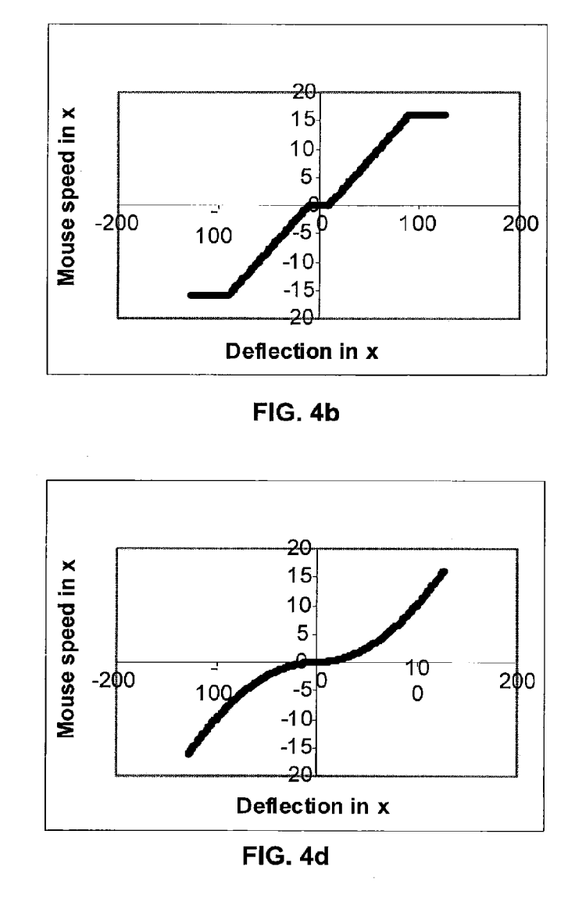

FIG. 3 is a block diagram showing an example system 300 for using a 2DOF thumbstick to capture thumb movements of a user. The captured thumb movement is used to control a speed of movement of a mouse cursor. The example system 300 is also applicable to other joystick based input devices, including thumb joysticks on game controllers and desktop joysticks.

From empirical human psychophysical experimentation, at least two modes of mouse operation are identified. A fast mode is used when the user is attempting to traverse large distances in the shortest time possible. An example of the fast mode includes moving a mouse pointer from one side of the display to another. In the fast mode, speed is paramount, and precision is secondary.

A slow mode is used when the user is attempting to move the mouse cursor to a specific target. Typically this type of fine mouse cursor control occurs after a fast, coarse motion has been completed to get the cursor to the general vicinity of the intended target. An example includes clicking on a button or menu item. In the slow mode, precision is paramount, and speed is secondary.

In one aspect, a deflection of a sensor, such as a joystick or thumbstick, is mapped to operate with these two modes. To incorporate the fast and slow modes for the joystick or thumbstick, a data structure, such as a smooth curve 310 can be used with a gentle slope near the center position that ramps up quickly near the edges of the range of motion. This can also be accomplished with a bilinear curve. However, the smooth curve 310 may be more effective due to the lack of discontinuities in the sensor mapping curve. By experimentally determining and adjusting the optimal sensor mapping curve for this application and inserting the sensor mapping curve between the sensor output 118 and the input 122 to the application 132 on the host device 130 (in this example, mouse-based navigation on a personal computer), the user experience is improved substantially. In addition, the sensor mapping curve reduces the time to acquire targets (as in a Fitts's Law experiment).

In some implementations, for a given input device, an optimal data structure or mapping curve can be experimentally determined and generated for each application. Once application specific optimal mapping curves are generated, a user is able to adjust parameters of the given input device using an operating environment, for example. Example parameters of the input device include mouse speed. Consider the mouse speed adjustment as a constant multiplier applied to the mapping curve. The mouse speed (to move the mouse cursor faster), can be increased by apply a multiplier of 1.2, for example. Similarly, the mouse speed can be reduced by applying a multiplier of 0.8. In either case, the user is able to control the speed by adjusting a particular control on a graphical user interface, for example. However, such user control is implemented without the user needing to know the identity of the curve, the multiplier or how the speed is adjusted. The user simply adjusts a control until the mouse's speed is comfortable for his personal preference and/or specific needs.

FIGS. 4a, 4b, 4c and 4d illustrate example data structures, such as sensor mapping curves. Potential shapes for the mapping curves can include a linear curve (FIG. 4a), a linear curve with a dead zone and upper limit cutoffs (FIG. 4b), a bilinear curve that includes a dead zone and upper limit cutoffs (FIG. 4c), a parabolic curve (FIG. 4d) or a cubic, polynomial, exponential, sigmoid, Bézier, Non-Uniform Rational B-Spline (NURBS) or other types of curves (not shown). The shape used may vary based on the application.

Figure 5A:
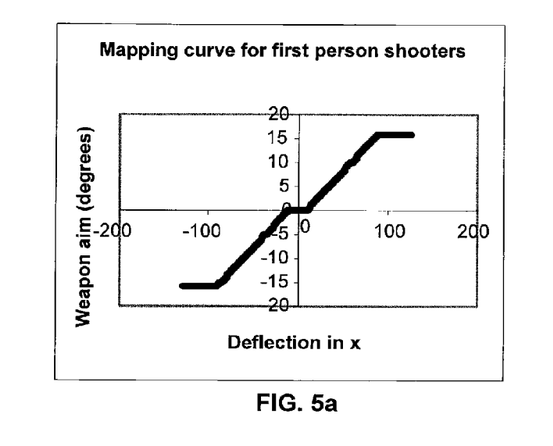
FIGS. 5a, 5b and 5c illustrate some examples of sensor mapping curves for an input device used to generate control signals that effect different types of actions in a game.
Figure 5B:
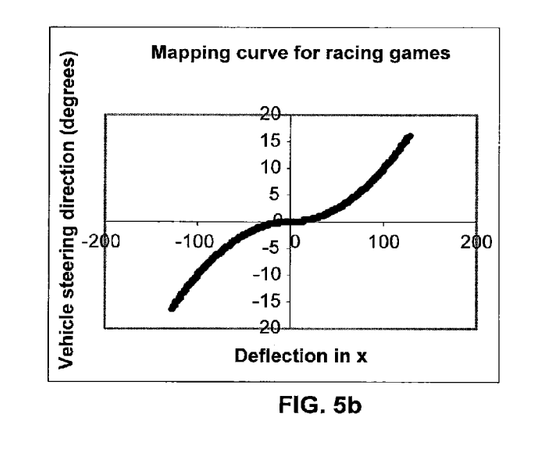
Figure 5C:
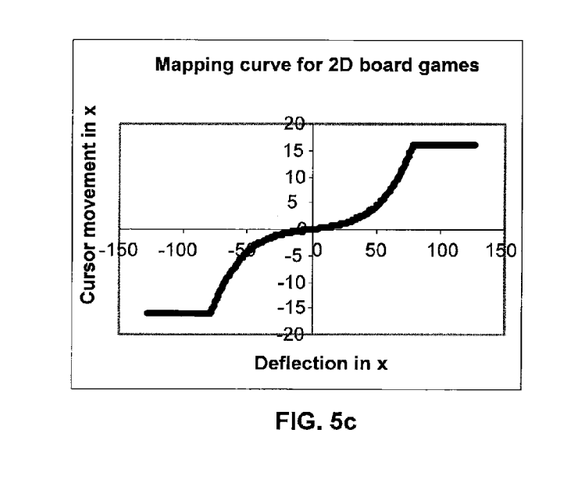

FIGS. 5a, 5b and 5c illustrate some examples of sensor mapping curves for an input device used to generate control signals that effect different types of actions in a game. The controls differ depending on the game. For a first-person shooter, a modified linear sensor mapping curve (FIG. 5a) with a dead zone and upper limit cutoffs might be the optimal shape, for example. For a racing game, a smoother transition (FIG. 5b) that offers more precise control near the center of the workspace and more abrupt turning akin to "speed steering" on real cars might be the optimal shape. For a 2D board game, the interaction is very similar to mouse cursor based navigation, and so a curve (FIG. 5c) that is optimal for the mouse may also be the best shape for such board game.

The examples shown in FIGS. 4a-5c are provided for illustrative purposes and are not intended to serve as an exhaustive list of interactions and candidate sensor mapping curves. For different classes of spatial interactions, different sensor mapping curves can be determined empirically and the sensor mapping curve for each class of interaction can be tuned to optimize its performance in a corresponding application. Example classes of spatial interaction can include moving a cursor in a 2D space, such as controlling the mouse on a PC. Another example class of spatial interaction includes moving a cursor in an icon grid, such as selecting an item in an icon grid on a PC, a PDA device, or a mobile phone. Yet another example class of spatial interaction includes selecting a tile anywhere on a 2D board, such as a puzzle game. Steering a vehicle in a racing game another example class of spatial interaction. Aiming a weapon in a first-person shooter represents yet another example class of spatial interaction. Controlling the position and orientation of an object, such as where a virtual baseball bat or a tennis racket is controlled in real time represents another example class of spatial interaction. Another example class of spatial interaction includes controlling the position of a game character or vehicle in aerial view, such as a helicopter fighting game on the mobile platform.

Figure 6A:
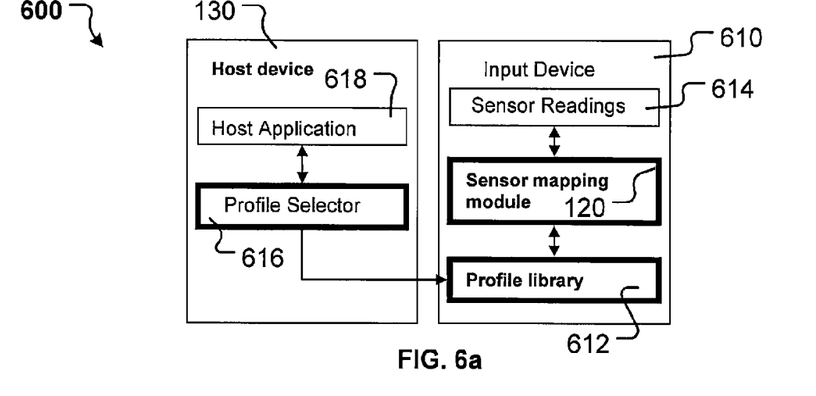
FIGS. 6*a*, 6*b* and 6*c* illustrate different examples of implementing a sensor mapping module.
Figure 6B:
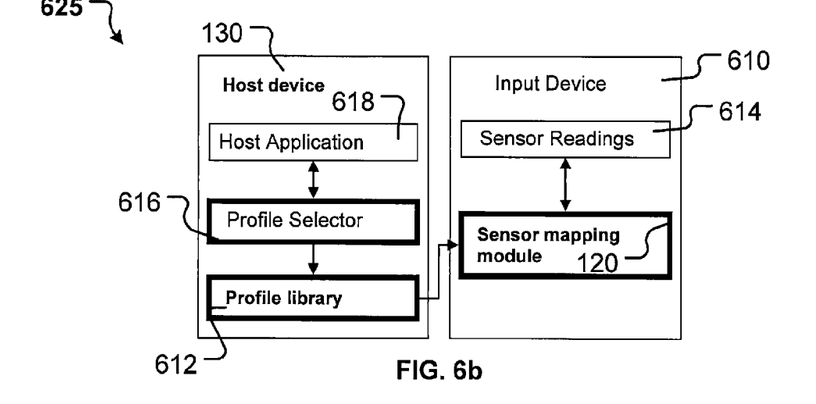
Figure 6C:
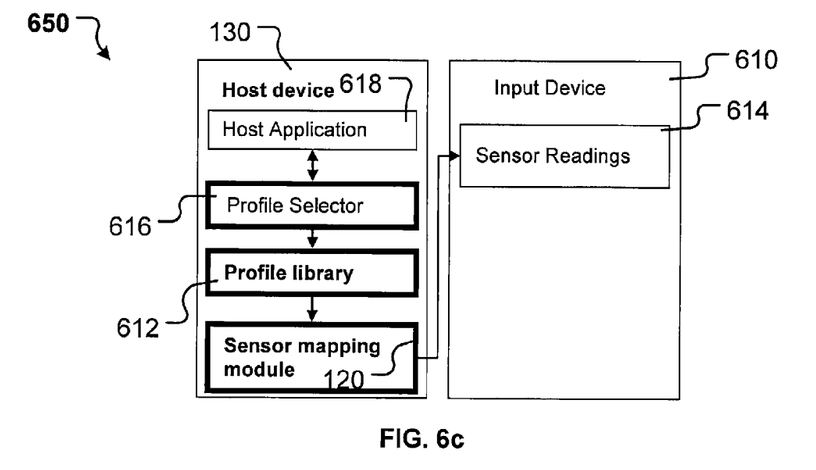

FIGS. 6a, 6b and 6c illustrate different examples of implementing a sensor mapping module. In FIG. 6a, the sensor mapping module 120 is located within an input device 610 that receives user input and issues control signals for applications running on a host device 130. The sensor mapping module receives sensor signals 614 from a sensor, and transforms these sensor signals 614 to control signals for a host application according to a profile curve. A library of profile curves 612 can be implemented in firmware of the input device 610. Host application 618 receives xy-readings from the input device 610. The received xy-reading may have been modified by a selected sensor mapping curve.

A non-volatile memory element can be provided within the input device 610 to store: (a) a library of sensor mapping curves 612 which are uniquely identifiable, (b) an identifier that indicates the current mode of mapping for the signals coming out of the input device 610 into the host application 618; and (c) a set of parameters that, together with the unique identifier that specifies curve type, completely describes the characteristics of the sensor mapping curve. The firmware in the input device 610 may store a default identifier that the firmware can revert to by default.

A sensor mapping scheme may be selected by a profile chooser or selector 616 in the host device 130. In some implementations, the profile selector uses a simple command language to specify the desired sensor mapping curve. In such implementations, the profile selector 616 sends to the profile library 612 of the input device 610 a command byte followed by a parameter that reflects the identifier of the sensor mapping curve to be selected and used by the host application 618. This identifier is stored and persists across power cycles. The profile selector 616 may also send a command byte and a special identifier to restore factory defaults. The profile selector 616 may also use other command syntax to communicate specifics about the desired sensor mapping curve.

Where a sensor mapping curve is described in the form of an equation or function, a host application may utilize a command language to specify the type of equation to be used, and the parameters that fully define the curve for that equation. For example, the host application may use a linear sensor mapping curve and supply the slope of this curve. This linear sensor mapping curve can be fully defined based on Equation 1 below.

$$X \text{ control signal} = K(X \text{ sensor signal}) \quad \text{(Equation 1)}$$

FIG. 6b illustrates another example implementation where a sensor mapping module resides on the embedded firmware running on a processor within the input device, while a profile library of sensor mapping curves is maintained in host software. Having the sensor mapping module at the input device 610 maintains fast and immediate conversion for sensor signals on the input device 610. Locating the profile library 612 at the host device 130 minimizes the memory requirements for the input device 610, where memory is often at a premium.

FIG. 6c illustrates yet another example implementation, where both a sensor mapping module 120 and a profile library 612 of data structures, such as sensor mapping curves are both maintained on a host platform 120. The sensor mapping module 120 and the profile library 612 can be located in the application software, a device driver, or some combination thereof. In this example, the input device 610 reports the sensor readings 614 and all signal mapping/conditioning can be performed on the host side in software. This provides minimal processing and memory requirements for the input device 610, while still offering a full range of flexibility that a library of sensor mapping curves provides.

The library of data structures 612 can include one or more mapping curves that are stored as a set of equations, functions, or lookup tables implemented in the sensor mapping module 120. The sensor mapping curves are not necessarily homogeneous. Also, the profile library may contain curves represented in various forms. Furthermore, some sensor mapping curves can be represented as a 'zoned' curve where each zone can be fully defined by a set of numeric parameters.

In another example, the host application may select a symmetric, degree 3 Nonuniform Rational B-Spline (NURBS) curve with uniform knots and three control points on each side of the zero position. Such symmetric curve can be fully defined by specifying the xy-coordinates of the three control points in the +x, +y quadrant using Equations 2-4 below. A fourth control point will always reside at (0,0) and therefore does not need to be specified as a parameter.

$$\text{Control point } 1 = (X1, Y1) \quad \text{(Equation 2)}$$

$$\text{Control point } 2 = (X2, Y2) \quad \text{(Equation 3)}$$

$$\text{Control point } 3 = (X3, Y3) \quad \text{(Equation 4)}$$

In the example where a zoned curve with predetermined characteristics for each segment is used, the type of curve need not be specified. Instead, the user simply supplies the parameters that define each segment. For example, a linear sensor mapping curve can be implemented with a dead zone near the center location and a cutoff near the limits of the range of motion. Such zoned curve can be fully defined using Equations 5 below.

$$X_{control\ signal} = 0 \text{ (if } \text{abs}(X_{sensor\ signal}) < X_{dead\ zone}) \quad \text{(Equation 5)}$$

$$= X_{cutoff} \text{ (if } \text{abs}(X_{sensor\ signal}) > X_{cutoff})$$

-continued $$= K(X_{sensor\ signal})$$

$$(\text{if } X_{dead\ zone} < \text{abs}(X_{sensor\ signal}) < X_{cutoff})$$

In Equation 5 above, $X_{control\ signal}$ is the control signal to the host application after all processing has been completed. $X_{sensor\ signal}$ is the output of the sensor conditioning logic in firmware after any optional smoothing or preliminary signal processing has been completed. $X_{dead\ zone}$ is the size of the dead zone in the center to avoid inadvertent cursor or game character movements due to small movements of the joystick or thumbstick near the center. $X_{cutoff}$ is the cutoff where the signal attains an upper or lower limit. K is the slope of the linear portion of the curve In this example, the host application simply needs to specify three parameters to fully define the zoned curve: (1) $X_{dead\ zone}$, (2) $X_{cutoff}$, and (3) K In yet another implementation, the sensor mapping curve is implemented as a lookup table with optional interpolation between entries in the table. A lookup tables is computationally lightweight. However, a lookup table may take up a lot of memory. Conversely, the closed form equation is light on memory footprint and heavy on computational load. Depending on the sensor mapping curve itself, and/or the memory and/or processing capabilities of the device that hosts the sensor mapping module, a combination of these two techniques to store the profile library 612 of curves may be used.

In some implementations, the host application may download its own custom sensor mapping curve. When a lookup table is used, the host application can stream the entire table to the input device, which can then store the table in non-volatile memory. Streaming the lookup table from the host device offers the host application maximum flexibility while keeping the footprint of the host application minimal.

When the sensor mapping module is implemented in firmware (see FIG. 2a for example), the same mappings can be provided for a variety of host devices. The ability to provide the same mappings independent of the host devices can lead to consistent user experience for the same class of interactions across a wide variety of host devices (e.g. personal computers, mobile phones, personal navigation systems, etc). In this and other examples, a variety of sensor mapping curves can be stored as a library in non-volatile memory of the input device. In addition, a host application can be provided with a unique sensor mapping curve that may not be offered as a standardized solution on the input device.

In the above described example, sensor mapping curves have been applied to a digital or analog control signal, where a user input such as movement or applied force is mapped to a position or speed or some such parameter. In many cases the mapped position or speed is specified as a variable number. In other cases, a sensor mapping curve mechanism can be used to convert sensor input effected by an end user, such as analog deflections on a joystick or thumbstick, to discrete key presses accepted by a host application as an input. For example, deflections on an analog joystick or thumbstick may be mapped to arrow key presses—typically in four directions: up, down, left and right. The actual angular deflection in any one of these four directions may be furthermore mapped to a speed of key repeat events for the corresponding directional button. Such a mechanism allows applications or systems that accept only digital control signals to behave as though it accepts analog control.

One such example is a handheld smartphone, such as Windows® Mobile® 6 devices that do not have a touch screen.

For example, the Samsung® Blackjack® II is a smartphone with a full QWERTY keyboard and a directional pad (D-pad). On this phone, the graphical user interface (GUI) is icon and list based. Navigation between screens is solely based on D-pad interaction, which is slow, inefficient and uncomfortable. Using the D-pad interaction, paging down quickly, such as when scrolling down a web page, reading email, or navigating through an icon grid can be particularly difficult.

The sensor mapping module described above can potentially emulate the arrow keys on the D-pad, and issue smart key-repeats, based on either how far the joystick or thumbstick is deflected or how long the joystick or thumbstick has been deflected. Thus, cursor navigation can be extended beyond a "one-click-moves-it-by-1-space" model, and the cursor could be moved around the screen much more quickly. The actual sensor mapping curve is determined and optimized by empirical testing.

Figure 7:
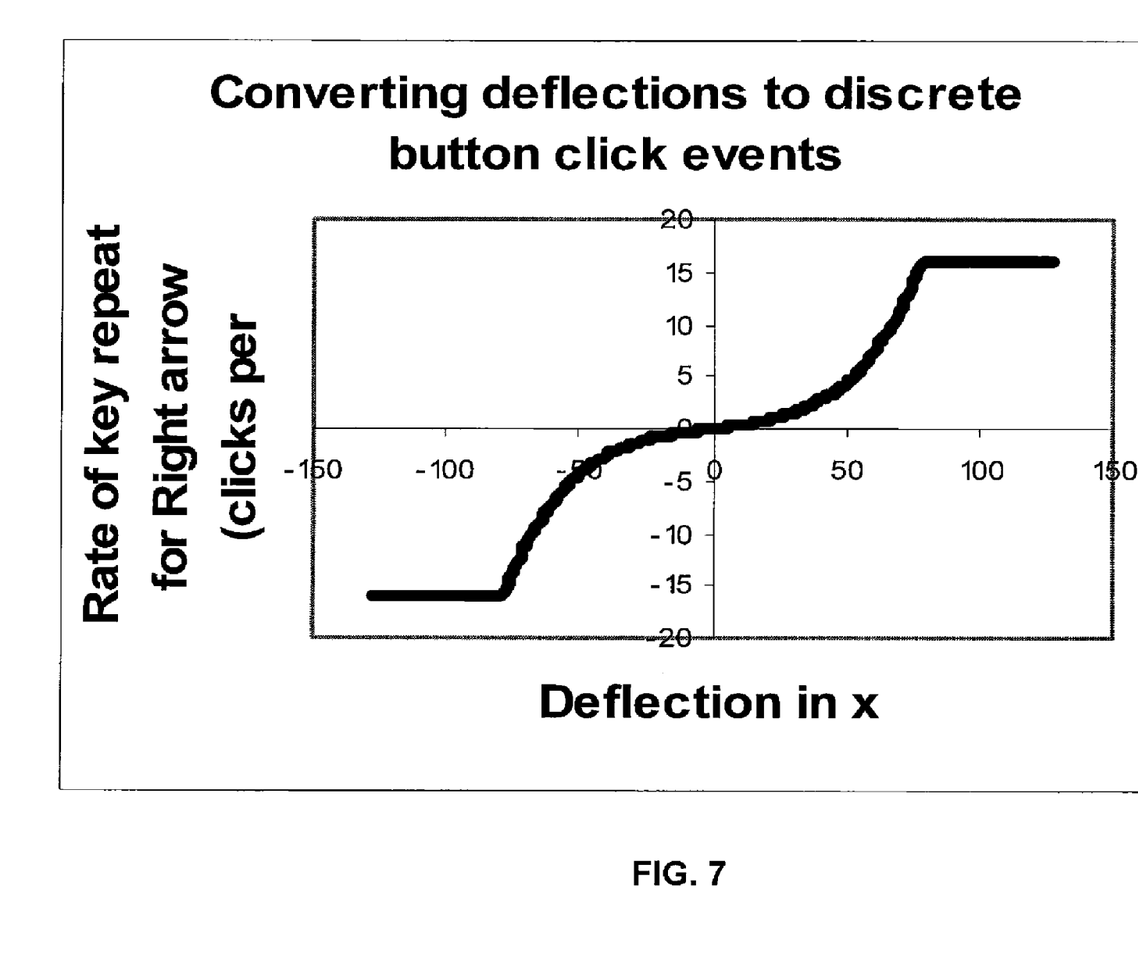
FIG. 7 illustrates an example implementation, where tapping the joystick or thumbstick once can emulate a single D-pad event (e.g. up arrow, down arrow, etc).

FIG. 7 illustrates an example implementation, where tapping the joystick or thumbstick once can emulate a single D-pad event (e.g. up arrow, down arrow, etc). Keeping the joystick or thumbstick deflected for over 1 second switches it into analog emulation mode. The rate of key-repeat events becomes proportional to the actual deflection, and so the cursor moves faster as the joystick is pushed out further.

In fact, intelligent translation of analog joystick or thumb stick deflections to key repeat events can be built into a D-Pad emulation module, residing in firmware or software, as modes that application developers can harness. These modes can provide the following events:

No key repeat—Deflecting the joystick or thumbstick issues one key-down event only. For example, moving the joystick or thumbstick up and leaving it up will result in a single up-arrow event.

Naïve key repeat based on holding the joystick or thumbstick down—Tapping the joystick or thumbstick up once results in a single up-arrow event, and leaving it deflected for a period exceeding a threshold time results in a constant rate of key-repeat events.

Continuously varying rates of key repeat events—Tapping the joystick or thumbstick up once results in a single up-arrow event, and leaving it deflected for a period exceeding a threshold time results in a variable rate of key-repeat events, where the rate of key-repeat events increases with increasing angular deflection of the joystick or thumbstick.

The continuously varying rates of key repeat events can mimic the mouse mode mapping described above (nonlinear graph that maps level of deflection to frequency of key repeat events). This means that prolonged joystick or thumbstick deflections at small angular deflections will result in slow key repeat events, and prolonged joystick or thumbstick deflections at large angular deflections will result in rapid key repeat events.

A parameter can be provided to allow a developer to define overall speed (slow, medium, fast, custom) to scale the entire mapping graph and match the specific needs of a game or the device at hand.

The techniques and systems as described in this specification can enhance user experience when providing user input. For example, a black-box processing module can be implemented to contain variable sensor mapping curves that relate human motion or applied force with the spatial control signals fed to an application (e.g., mouse cursor based navigation within an operating system being classified as a type of application.) In addition, spatial input needs for common applications can be classified and an optimal sensor mapping curve form can be determined for a given input device, such as a joystick or thumbstick. A different optimal sensor mapping curve form may be determined for the same application being used with a different input device, such as a trackball. Also, a menu or library of predetermined sensor mapping curves can be provided to service the identified classes of spatial input needs.

Also, various alternative system architectures can be implemented to vary the storage location of the sensor mapping curves (e.g., in firmware), which can be called out by sending a signal over a communications channel. For example, these sensor mapping curves can be stored in a statically-linked or dynamically-linked library to be incorporated into an application, or implemented in a device driver running on a particular computing platform (for example, Microsoft Windows®).

Further specific forms of these sensor mapping curves can be implemented that map the sensor output from a joystick or thumbstick to common classes of spatial input needs, such as: (1) a polynomial or sigmoid form for 2D cursor control (includes mouse operation and any games that involve navigating in 2D); (2) a parabolic, cubic, polynomial, or bilinear form for steering in racing games; (3) a polynomial or sigmoid form for 2D navigation in a board based game; (4) a Bézier or NURBS curve, and (5) any sensor mapping curve with the output being the modulation of a digital signal.

The sensor mapping curves can be implemented in a variety of ways, including: (1) a look up table, where the raw sensor signal is mapped to an output value as a table look up operation with optional interpolation between values; (2) an equation or function, where there exists a command interface for the application to choose the type of curve to use and specify parameters that define the shape of the equation or function; and (3) a parameterized zoned curve, where a standard breakdown of each region of the curve may be defined and the location and exact characteristics of each region can be specified using parameters.

Figure 8A:
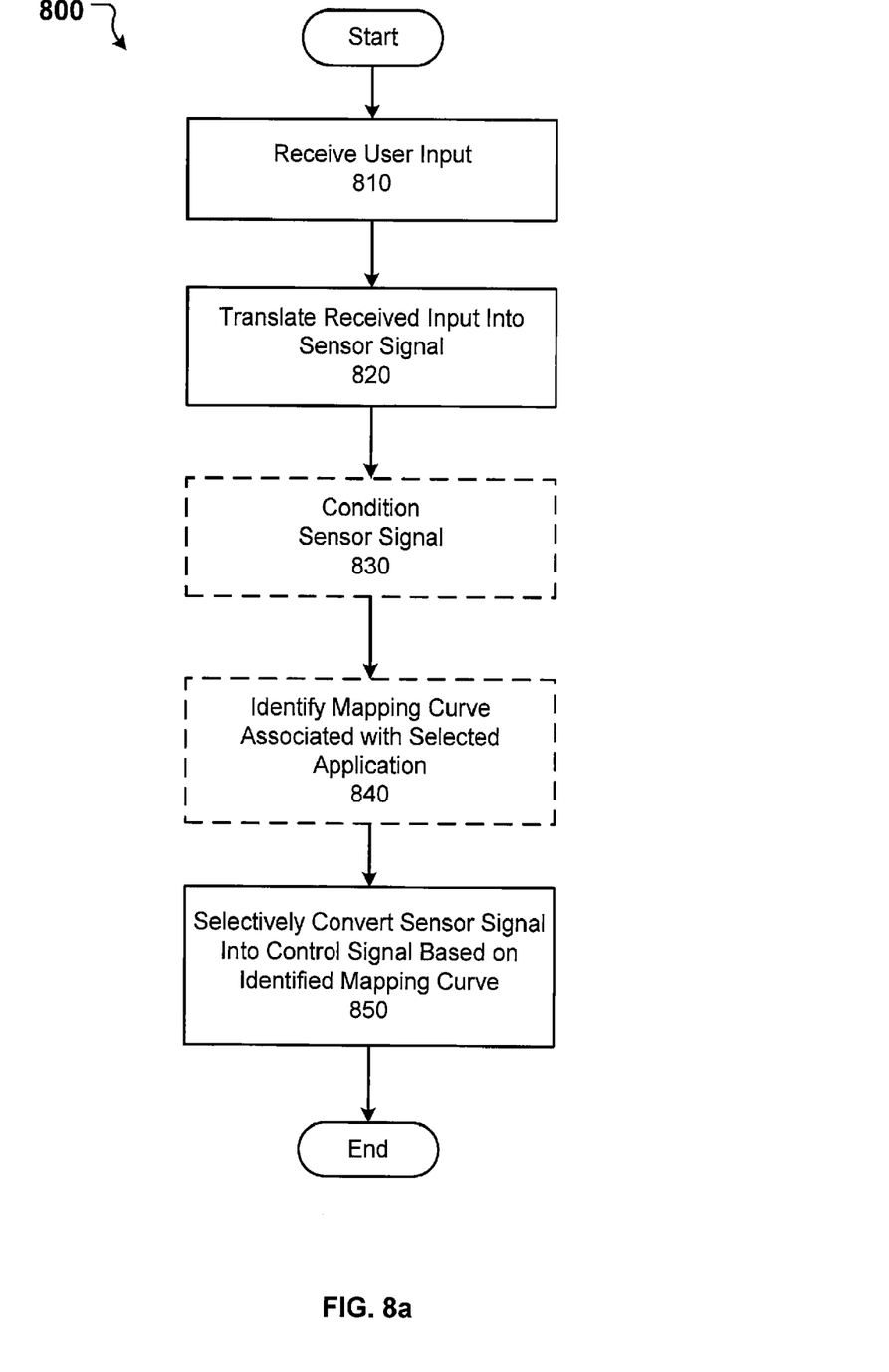
FIGS. 8*a* and 8*b* show an example process 800 for sensor mapping.
Figure 8B:
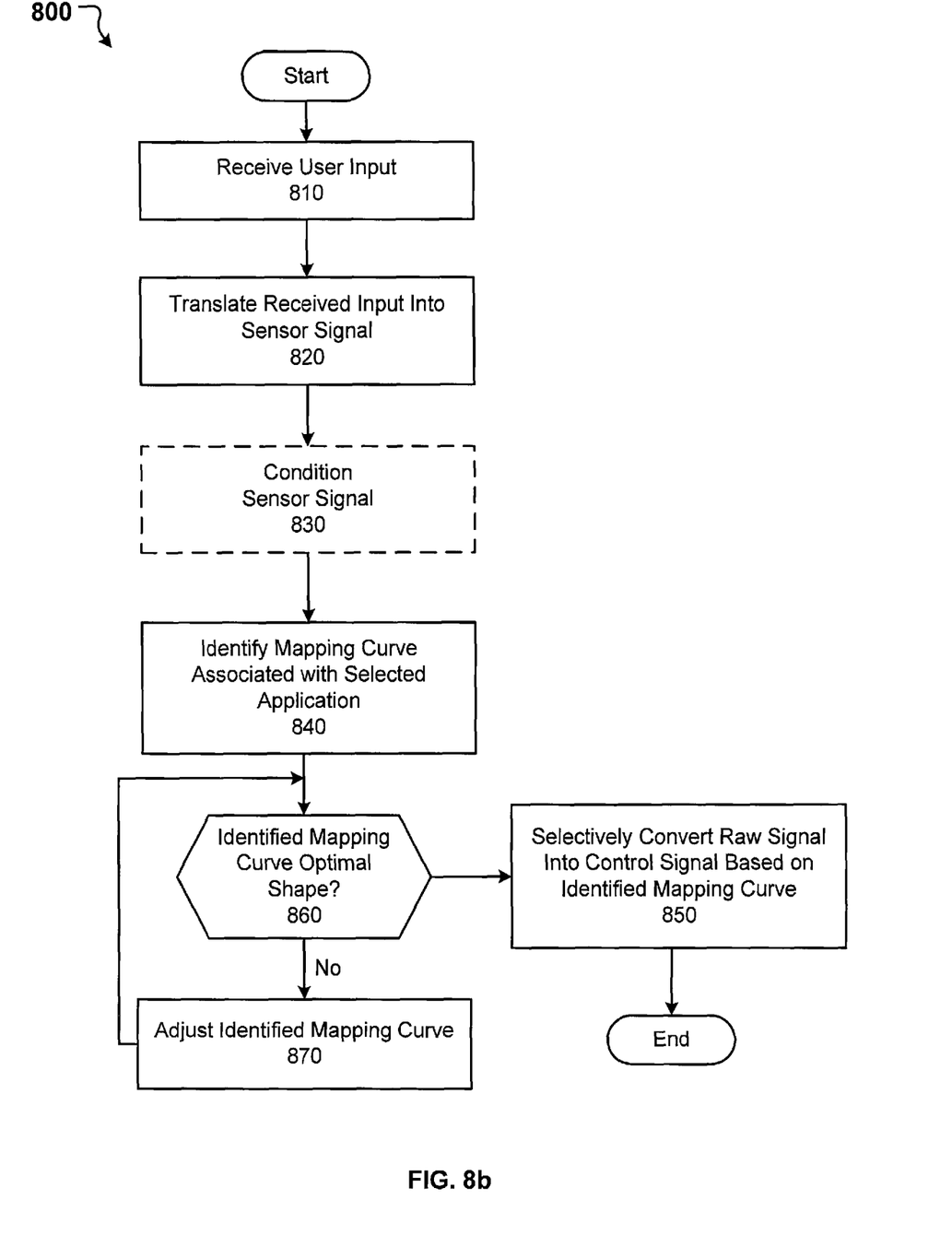

FIG. 8 shows an example process 800 for sensor mapping. A system (e.g., system 100, 200, 250, 300, 600, 625, 650) receives input from a user (810). For example, a sensor such as a joystick or thumbstick can be used to receive the user input. The system then translates 820 the received input into a sensor signal. The sensor signal is an electrical signal that represents the received user input, such as up, down, or side deflections of the joystick or thumbstick. The system can optionally condition 830 the sensor signal by smoothing or filtering the sensor signal to remove noise, for example.

The system can optionally identify a sensor mapping curve associated with a selected application. For example, the selected application can be a game application, and the sensor mapping curve can be identified based on the selected game application. For example, the sensor mapping curve identified can be of a particular shape for a "first-person shooter game" and a different shape for a "driving simulation game." Using the identified sensor mapping curve, the system converts 850 the sensor signal to a control signal for controlling one or more functions of the selected application. The sensor mapping curve accepts the sensor signal as input and generates a corresponding control signal output based on its characteristic curve shape.

As described with respect to FIGS. 4a-5c above, the sensor mapping curve represents a relationship between the sensor signal (which reflects the user's physical input) and the control signal needs for certain functions of the selected application. The shape of the sensor mapping curve dictates responsiveness of the functions being controlled based on the sensor signal. For example, a non-linear shape of the sensor mapping curve will provide a nonlinear control of the functions based on the user input (e.g., joystick or thumbstick deflection). Referring back to FIG. 5b, controlling the vehicle steering function can be accomplished using the non-linear sensor mapping curve as shown in FIG. 5b.

In addition, the sensor mapping curve can be selected and/or adjusted based on a preference of the user. For example, when the selected application is a game application, each user may desire different responsiveness because of user preference or user skill level. For example, a novice to a driving simulation game may desire a less responsive sensor mapping curve to steer a vehicle. This may be desired when the novice has a tendency to "over-steer" (e.g., by applying a large deflection) when turning on a corner. To prevent the vehicle from turning too much, the sensor mapping curve may be adjusted to provide a reduced response when such large deflection of the joystick or thumbstick is detected. Alternatively, a skilled gamer may desire more responsiveness to obtain minute adjustments of the vehicle using minute deflection of the joystick or thumb stick.

Once the sensor mapping curve has been selected the system can convert the sensor signal into the control signal using the selected sensor mapping curve.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible computer readable medium for execution by, or to control the operation of, data processing apparatus. The tangible computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this application. For example, the input device can include various sensor/controller components, such as an accelerometer, a trackball, a slider, a button, etc. In addition, the input device can be implemented using form factors other than handheld, such as docked device, etc.

Moreover, the methods to provide data input, device control or game control may be performed in a different order and still achieve desirable results. Accordingly, other implementations are within the scope of the following claims.

What is claimed is:

1. A method comprising:
receiving input from a user, wherein the received input includes at least one of motion, force and contact;
generating a sensor signal based on the received input;
identifying from a choice of data structures a data structure associated with a selected application having one or more functions, wherein the identified data structure indicates a relationship between the generated sensor signal and the one or more functions of the selected application; and
selectively mapping the generated sensor signal to a control signal for controlling the one or more functions of the selected application based on the identified data structure.

2. The method of claim 1, further comprising:
selecting the identified data structure from the choice of data structures based on a type of the selected application.

3. The method of claim 1, further comprising:
selecting the identified data structure from the choice of data structures based on the one or more functions of the selected application.

4. The method of claim 1, further comprising:
conditioning the generated sensor signal that includes at least one of smoothing, noise reduction and non-linear conformal mapping.

5. The method of claim 1, wherein identifying a data structure comprises:
identifying a data structure that includes a mapping curve from a choice of mapping curves.

6. The method of claim 5, wherein identifying the mapping curve comprises:
identifying a nonlinear mapping curve that comprises a slope near a center of the curve and another slope near extrema of the curve, wherein the other slope is less steep than the slope near the center.

7. The method of claim 1, wherein identifying a data structure comprises:
identifying a data structure that includes a lookup table.

8. The method of claim 7, further comprising:
streaming the lookup table from a host device to an input device; and
selectively mapping the generated sensor signal into the control signal using the streamed lookup table.

9. A system comprising:
a sensor component configured to
receive input from a user, wherein the received input includes at least one of motion, force and contact, and generate a sensor signal based on the received input; and
a sensor mapping component to communicate with the sensor component, wherein the sensor mapping component is configured to:
receive a data structure selected from a choice of data structures that indicates a relationship between the generated sensor signal and one or more functions of a selected application, and
selectively convert the generated sensor signal into a control signal configured to control the one or more functions of the selected application using the received data structure.

10. The system of claim 9, further comprising:
a data storage component to communicate with the sensor mapping component, wherein the data storage component is configured to store the choice of data structures to be forwarded to the sensor mapping component.

11. The system of claim 10, further comprising:
a selector component to communicate with the selected application and the data storage component, wherein the selector component is configured to:
select a data structure from the choice of data structures stored in the data storage component based on the selected application; and
forward the selected data structure to the sensor mapping component to use in converting the sensor signal.

12. The system of claim 11, further comprising
a device driver to communicate with the selector component.

13. The system of claim 11, wherein the sensor mapping component and the data storage component are disposed on an input device; and
the selector component is disposed on a host device separate from the input device, wherein the selector component is configured to communicate with the storage device over a wired or wireless communication medium to select the data structure from the choice of data structures.

14. The system of claim 11, further comprising:
an input device; and
a host device to communicate with the input device.

15. The system of claim 14, wherein the sensor mapping component is disposed within the input device, and the data storage component and the selector component are disposed within the host device separate from the input device; and
the sensor mapping component is configured to communicate with the storage device over a wired or wireless communication medium to receive the selected data structure.

16. The system of claim 14, wherein the sensor component is disposed on the input device; and
the sensor mapping component, the data storage component and the selector component are disposed within the host device, wherein the sensor mapping component is configured to communicate with the sensor component over a wired or wireless communication medium to receive the sensor signal.

17. The system of claim 11, wherein the selector component is configured to identify the data structure from the choice of data structures based on the selected application that includes a game application.

18. The system of claim 17, wherein the selector component is configured to identify the data structure from the choice of data structures based on a type of application.

19. The system of claim 11, wherein the selector component is configured to select the data structure from the choice of data structures that includes at least one nonlinear mapping curve.

20. The system of claim 11, wherein the selector component is configured to select the data structure based on the one or more functions of the selected application.

21. The system of claim 10, wherein the data storage component is configured to:
store the choice of data structures comprising lookup tables; and
stream one of the lookup tables to the sensor mapping component.

22. The system of claim 10, wherein the data storage component is configured to:
store the choice of data structures comprising mapping curves; and
stream one of the mapping curves to the sensor mapping component.

23. A computer program product, embodied on a non-transitory computer readable medium, operable to cause a data processing apparatus to perform operations comprising:
receiving input from a user, wherein the received input includes at least one of motion, force and contact;
generating a sensor signal based on the received input;
identifying a data structure associated with a selected application having one or more functions, wherein the identified data structure indicates a relationship between the generated sensor signal and the one or more functions of the selected application; and
selectively converting the sensor signal into a control signal for controlling the one or more functions of the selected application based on the identified data structure.

24. The computer program product of claim 23, further operable to cause a data processing apparatus to perform operations comprising:
select the identified data structure based on a type of the selected application.

25. The computer program product of claim 23, further operable to cause a data processing apparatus to perform operations comprising:
adjust the identified data structure based on the one or more functions of the selected application.

26. The computer program product of claim 23, further operable to cause a data processing apparatus to perform operations comprising:
select a data structure from a choice of data structures associated with the selected application.

27. The computer program product of claim 26, further operable to cause a data processing apparatus to select a lookup table from the choice of data structures comprising lookup tables.

28. The computer program product of claim 27, further operable to cause a data processing apparatus to stream the selected lookup table from a host device to an input device, wherein the streamed lookup table is used to convert the generated sensor signal into the control signal at the input device.

29. The computer program product of claim 23, further operable to cause a data processing apparatus to perform operations comprising:
condition the sensor signal that includes at least one of smoothing, noise reduction and non-linear conformal mapping.

* * * * *